3,060,171
PROCESS FOR INCREASING THE VISCOSITY OF ALKALI-METAL PHOSPHATE-MODIFIED STARCHES
Jacob W. Sietsema, Minneapolis, Minn., assignor to International Minerals & Chemical Corporation, a corporation of New York
No Drawing. Filed Oct. 3, 1960, Ser. No. 59,827
6 Claims. (Cl. 260—233.5)

This invention relates to an improved process for preparing high viscosity phosphate-modified starches. In a preferred aspect, this invention relates to an improved process for preparing high viscosity phosphate modified starches of the Neukom type wherein higher viscosities are obtained in greater yield with smaller quantities of material than processes previously employed.

The preparation of alkali-metal phosphate-modified starches is described by Hans Neukom in U.S. Patents Nos. 2,865,762 and 2,884,412 which issued, respectively, on December 23, 1958, and April 28, 1959. In the Neukom method, starch is impregnated with an aqueous solution of an orthophosphate salt, dried to a moisture content less than about 15% by weight, then heated to an elevated temperature at which the substance reacts in a way not well understood, producing a modified starch of ready dispersibility in cold water. The starches produced in accordance with the procedure described by Neukom are classed as technical grade starch phosphates and usually have a viscosity in 5% aqueous solutions ranging from as low as 1000 up to about 20,000 centipoises. For purposes of simplification, these products are referred to as Neukoma-type starches. For many purposes it is desirable to have a product having a viscosity in excess of 50,000 and even over 100,000 centipoises and to this extent it has been necessary to purify and fractionate a technical grade starch phosphate to recover a product having a high viscosity.

The process which has been employed in the past to produce high viscosity Neukoma type-phosphate-modified starches is described in co-pending U.S. patent application of Jacob W. Sietsema and William C. Trotter, Serial No. 637,351, filed January 31, 1957, now Patent No. 2,993,041. While the procedure described therein is effective for achievinng the desired result, it requires a large quantity of solvent, for example, as much as about 25 pounds of solvent per pound of technical grade product processed, and usually at least three precipitations are necessary to achieve a product having a viscosity in excess of 50,000 centipoises. Also, in view of the number of precipitations and washings required in the prior process, there is ample opportunity for loss of product which results in lower yields. My improved process as described in more detail hereinafter allows for the formation of a high viscosity product made by a single precipitation directly from the technical grade material with a considerable savings in time, reagents and equipment. At the same time, the yield by my method is increased to approximately 90% as compared with approximately 75% by the older method.

It is, therefore, an object of the present invention to provide an improved process for the preparation of high viscosity Neukom-type starch phosphates.

It is another object of this invention to provide an improved process for the preparation of high viscosity Neukom-type starch phosphates wherein products having a viscosity in 5% aqueous solution ranging between 50,000 and 100,000 centipoises and higher are prepared in a single precipitation.

A further object of this invention is to provide an improved process for the preparation of high viscosity Neukom-type starch phosphates which affords considerable savings in time and reagents and results in improved yield over previously used methods.

These and other objects of the invention will be apparent from the description which follows.

The process of the present invention employs as a starting material alkali-metal phosphate-modified starches of the Neukom type including those prepared from potato starch, corn starch, wheat starch, cassava starch, arrowroot starch and the like as described in detail in the two U.S. patents referred to hereinbefore.

In accordance with the present invention, a technical grade Neukom-type phosphate-modified starch is dispersed at a temperature between about 30 and 70° C., but below temperature where gelatinization occurs, into an aqueous solution containing between about 30 and about 50 volume percent of an inert oxygen-containing water-miscible organic liquid, such as methanol, acetone, or the like, as will be more fully described hereinafter. Precipitation is effected by adding to the aforementioned dispersion a sufficient quantity of inert oxygen-containing water-miscible organic liquid and cooling the mixture to a temperature between about −20 and about 25° C. The precipitate is then separated from the liquid phase and washed several times at the low temperature with aqueous solutions of higher volume percent concentrations of the common inert oxygen-containing water-miscible organic liquid and finally with dry solvent at room temperature. The product is then preferably dried. The resulting material is the improved composition of the invention and contains a decreased proportion of inorganic phosphates, low viscosity starch phosphates and other impurities. Further, aqueous solutions thereof are substantially higher in viscosity than aqueous solutions of the starting material.

In preparing the phosphate-modified starches of Neukom, starch is heated at a temperature between about 120 and about 175° C. with certain phosphate salts. In one representative method dry, ungelatinized starch is immersed in an aqueous solution of an alkali-metal orthophosphate, the liquid phase is removed, and the product air dried to less than about 15% moisture following which the mixture is heated for around 1 to 15 hours at about 130 to 170° C., preferably about 5 hours at about 160° C. The length of the heating period varies inversely with the temperature. A cold water-soluble starch is obtained thereby having a viscosity between about 1000 and about 20,000 centipoises, generally between about 5,000 and 15,000 centipoises measured in 5% aqueous solution at room temperature.

Preferred phosphate salts are sodium, potassium, and lithium orthophosphates, alone or in suitable combinations to yield a pH in aqueous solution between about 4 and about 7, preferably around 6, measured at 25° C. at the concentration employed. For example, monosodium orthophosphate and disodium orthophosphate are combined in aqueous solution in such proportions as to produce a pH between about 6 and about 7. Or the desired salts may be formed in situ, for example by dissolving trisodium orthophosphate or other basic phosphate salt in water and adjusting the pH of the solution to the desired level by adding orthophosphoric acid or an acidic orthophosphate salt. Alternatively, orthophosphoric acid or an acidic phosphate salt in aqueous solution may be adjusted upward to the desired pH by adding an alkali-metal hydroxide or a basic alkali-metal orthophosphate salt.

The phosphate solution may suitably be between about 1 and about 3 molar in phosphate and should be used in a quantity equivalent to at least about 1% by weight of phosphorus, preferably between about 3 and about 5%, based on the quantity of starch to be treated. The quantity and concentration of solution should be chosen so that the starch will form a slurry when commingled therewith. The quantity of starch will generally be less than 1.5 times the weight of the water contained in the solution, and will preferably be less than the weight of water. The slurry should be agitated or stirred for 5 to 10 minutes or more to permit the starch granules to become soaked with the solution.

The soaked starch granules are separated from the solution by filtration, centrifugation, or the like, and the liquid phase is largely removed, suitably by air drying at a temperature below the point at which starch gelatinizes, e.g., below about 60 to 80° C., depending upon the particular starch. The resulting granules, which generally contain between about 8 and about 15% of water, are subjected to a heat treatment as set forth hereinabove. The heat-treated material is a phosphate-modified starch suitable for use as the starting material in my invention.

The inert oxygen-containing water-miscible organic liquid employed in the process of the present invention, both in aqueous solution and for precipitating purified phosphate-modified starch from the dispersion, is an oxygen-containing water-miscible organic liquid which is inert toward the contents of the purification medium under the conditions employed. These substances, when employed in the proportions defined above, are anti-solvents for high viscosity phosphate-modified starches, but not for low viscosity phosphate-modified starches or unbound inorganic phosphate and other salts. Suitable materials include acetone, dioxane, tetrahydrofurfuryl alcohol, and water-miscible aliphatic monohydric alcohols, viz., methanol, ethanol, n-propyl alcohol and isopropyl alcohol; the water-miscible aliphatic polyhydric alcohols, such as ethylene glycol, propylene glycol, glycerol and the like; the water-miscible aliphatic ether-alcohols, such as ethylene glycol methyl ether, and di-ethylene glycol ethyl ether; the water-miscible glycol di-ethers such as di-ethylene glycol, di-ethyl ether and the like.

In carrying out the process of the present invention a quantity of the technical grade phosphate-modified starch described hereinabove is dispersed in an aqueous solution containing between about 30 and about 50 volume percent of the organic liquid described hereinbefore at a temperature between about 30 and about 70° C., but below temperature where gelatinization occurs, in a proportion between about 10 and 20% by weight or higher up to the saturation level. When the starting material is in the form of a dry powder, it may tend to cake when first added to the aqueous solution. This can be prevented by first wetting it with a small quantity of the organic liquid common to that used in the organic solution and later used as the precipitant. The mixture is preferably stirred to assure complete dispersion after which there is added to the dispersion a quantity of the organic liquid common to the aqueous solution to effect precipitation of a high viscosity modified starch product. The mixture is then cooled to a temperature between about −20 and about 25° C., preferably about 20° C. The proportion of added organic liquid should be great enough to produce an effective precipitation of a phosphate-modified starch fraction of high viscosity, but not high enough to precipitate unbound inorganic salts, low viscosity starch fractions, or other substances. I have observed that the proportion of added organic liquid to effect precipitation should in general be sufficient to provide a final volume percent in the range between about 40 and about 60. The mixture is preferably agitated during the cooling step and, if desired, chlorine may be bubbled in during the cooling to bleach the starch phosphate. After cooling, the solids are separated from the aqueous phase either by filtration or centrifugation, preferably the latter. The solids are then subjected to several washings at the low temperature employing aqueous solutions of successively higher volume percent of the organic liquid than the final volume percent after precipitation followed by the final washing with dry organic liquid at room temperature. The intermediate washes preferably employ aqueous solutions having concentrations in the range of about 50 to about 80 volume percent solvent, and still more preferably in 10% increments above the final concentration after precipitation and the preceding wash solution. The product is then dried, suitably in air, and preferably at a temperature not exceeding about 80° C. The removal of the water prior to drying is desirable in order to avoid hydrolysis, saponification, gelatinization, and other side reactions during the drying operation. In many applications, the organic liquid need not be removed and the wet solids can be used without further treatment. In either event, the final product is a phosphate-modified starch having a substantially higher viscosity compared with the starting material, in excess of 50,000 centipoises and as high as 100,000 centipoises in 5% aqueous solution at room temperature, depending partly upon the quality or grade of the starting material.

In a preferred embodiment of the process of the present invention, methanol is employed as the organic precipitation agent and a dispersion containing about 18 weight percent of modified starch phosphate in 40 volume percent aqueous methanol is prepared at a temperature of about 45° C. Sufficient methanol, essentially anhydrous, is added to the slurry to provide a final volume percent of methanol of about 50 and the mixture is cooled with agitation to a temperature of about 15 to about 20° C. The addition of methanol effects precipitation of the desired high viscosity product. The solids are separated from the aqueous phase by centrifugation and washed at 20° C., first with 60% methanol and then 75% methanol, followed by a final washing with pure methanol at room temperature. The product is then dried in an air oven at a temperature between 70 and 80° C.

The products of the present improved process are especially useful as thickening agents in food products such as soups, ice cream, puddings, salad dressings, mayonnaise, pie filling, and the like. They are also useful as sizing agents in the surface finishing of paper and textiles, as beater additives in paper making prior to mat formation, as inhibitors of water loss in oil well drilling muds, as core binders in the preparation of foundry cores, and as desliming agents in potash ore flotation.

The phosphate-modified starches form clear dispersions in water which are more or less viscous, depending upon concentration, and which are believed to be more or less colloidal in nature. Such dispersions may be referred to as "solutions," viz., colloidal solutions, but it is not intended to imply that the dispersions may be true solutions.

All viscosity measurements described herein were made on 5% aqueous solutions at room temperature (about 25° C.) with a Brookfield "Synchro-Lectric" viscometer manufactured by Brookfield Engineering Laboratories, Cushing, Mass., employing spindles and speeds as follows:

| Viscosity Range, cp. | Spindle No. | Speed, r.p.m. |
| --- | --- | --- |
| 0–10,000 | 3 | 12 |
| 10,000–50,000 | 4 | 12 |
| 50,000–100,000 | 4 | 6 |

The following examples are intended to illustrate the underlying principles of the present invention and are not to be construed as unduly limiting thereof.

*Example 1*

A technical grade of Neukom-type phosphate-modified starch was prepared by mixing 100 pounds of Amaizo PF cornstarch with an aqueous solution containing 46.8 pounds of water, 16.5 pounds of $Na_2HPO_4 \cdot 2H_2O$, 6.5 pounds of $NaH_2PO_4 \cdot H_2O$ in an Abbé mixer at a temperature of about 55° C. for a period of about 15 minutes. The product was then dried at 60° C. for about 11 hours. The product was then spread in trays and baked for from 3½ to 8 hours at a temperature of from 160 to 170° C. The final product had a viscosity after grinding of about 16,000 centipoises in 5% aqueous solution at room temperature and contained about 5.0% sodium and about 4.0% phosphorus.

120 grams of the technical grade starch phosphate prepared as described hereinabove were suspended in a mixture of 300 ml. of water and 210 ml. of methanol at 45° C. The mixture was stirred for three minutes. 75 ml. of methanol were added and the suspension was cooled with moderate agitation to 20° C. in 5 to 10 minutes. Chlorine was bubbled in during the cooling to bleach the starch phosphate. The solids were then filtered in a perforated basket centrifuge and washed first with 138 ml. of 60% methanol (v./v.) at 20° C., then with 210 ml. of 75% methanol (v./v.) at 20° C. and finally with 330 ml. of synthetic methanol at room temperature. The product was dried overnight at 70 to 80° C. 105.5 grams of product was obtained, representing an 88% yield, having a viscosity of 75,000 centipoises (No. 4 spindle at 6 r.p.m.). Calculating, using 0.8 as an average density for methanol, about 5.9 grams of methanol per gram of technical grade starch phosphate was used.

*Example II*

40 grams of the technical grade starch phosphate employed in Example I were dispersed into an aqueous mixture containing 70 ml. of methanol and 100 ml. of water at a temperature of 45° C. The suspension was mixed for a short time and 25 ml. of methanol were added thereto following which the mixture was cooled to 0° C. The mixture was agitated during the cooling operation. The solids were then filtered in a perforated basket centrifuge and washed at 0° C. with 46 ml. of 60% aqueous methanol. The solids were again washed at 0° C. with 60 ml. of 75% aqueous methanol. The final wash was at room temperature with 110 ml. of dry methanol. The solids were air dried at 70 to 80° C. 37.7 grams, representing 94.4% yield, were obtained. The product had a viscosity of 73,000 centipoises (No. 4 spindle at 6 r.p.m.). Using the same basis of calculation employed in Example I, about 5.5 grams of methanol per gram of technical grade starch phosphate was used.

While this invention has been described and exemplified in terms of a preferred embodiment, it will be appreciated that numerous modifications and improvements can be employed without departing from the spirit and scope of this invention.

I claim:

1. An improved process for treating alkali-metal phosphate-modified starch and separating therefrom an alkali-metal phosphate-modified starch fraction of increased viscosity when dispersed in water, said modified starch having been obtained by reaction of starch with an alkali-metal orthophosphate at a temperature between about 120 and about 175° C., which comprises dispersing said alkali-metal phosphate-modified starch in an aqueous solution containing between about 30 and about 50 volume percent of an inert oxygen-containing water-miscible organic liquid at a temperature of about 30 to about 70° C., but below the gelatinization temperature; adding a sufficient quantity of inert oxygen-containing water-miscible organic liquid common to said original solution to precipitate an alkali-metal phosphate-modified starch fraction of substantially higher viscosity in aqueous dispersion than the original material while retaining unbound inorganic salts and lower viscosity starch fractions in the dispersed state; cooling the mixture while agitating the same to a temperature of about −20 to about 25° C.; separating the precipitate from the cooled slurry; washing said precipitate at the lower temperature with aqueous solutions containing successively higher volume percent concentrations of common inert oxygen-containing water-miscible organic liquid; and finally washing the precipitate with dry inert oxygen-containing water-miscible organic liquid.

2. The process of claim 1 wherein chlorine gas is bubbled through the dispersion during the cooling step.

3. An improved process for treating an alkali-metal phosphate-modified starch and separating therefrom an alkali-metal phosphate-modified starch fraction of substantially increased viscosity when dispersed in water, said modified starch having been obtained by soaking starch in aqueous solution of an alkali-metal orthophosphate, separating the starch from said solution, drying the starch to a water content below about 15% at a temperature below the point at which starch gelatinizes, and heating the starch at a temperature between about 130 and 170° C. for about 1 to about 15 hours, which process comprises dispersing said alkali-metal phosphate-modified starch in an aqueous solution containing between about 30 and about 50 volume percent of a water-miscible aliphatic monohydric alcohol at a temperature between about 30 and about 70° C.; adding a sufficient quantity of water-miscible aliphatic monohydric alcohol common to said original solution to raise the concentration by about 10% and to precipitate an alkali-metal phosphate-modified starch fraction of substantially higher viscosity in aqueous dispersion than the original material while retaining unbound inorganic salts and lower viscosity starch fractions in the dispersed state; cooling the mixture while agitating the same to a temperature of about −20 to about 25° C.; separating the precipitate from the cooled slurry; washing said precipitate at the lower temperature with an aqueous solution containing between about 50 and about 80 volume percent of common water-miscible aliphatic monohydric alcohol; washing the precipitate again at the low temperature with an aqueous solution containing between about 60 and 80 volume percent of water-miscible aliphatic monohydric alcohol; and finally washing the precipitate with dry aliphatic monohydric alcohol.

4. A method according to claim 3 wherein the water-miscible aliphatic monohydric alcohol is methanol.

5. A method according to claim 3 wherein the water-miscible aliphatic monohydric alcohol is ethanol.

6. An improved process for treating an alkali-metal phosphate-modified starch and separating therefrom an alkali-metal phosphate-modified starch fraction of substantially increased viscosity when dispersed in water, said modified starch having been obtained by soaking starch in an aqueous solution of an alkali-metal orthophosphate, separating the starch from said solution, drying the starch to a water content of about 15% at a temperature below the point at which starch gelatinizes, and heating the starch to a temperature between about 130 and about 170° C. for about 1 to about 15 hours, said alkali-metal phosphate-modified starch having a viscosity when dispersed at 5% concentration in water not in excess of about 20,000 centipoises, which process comprises preparing a dispersion of said starch phosphate containing about 15 to about 20 weight percent starch phosphate in 40 volume percent aqueous methanol at a temperature of about 45° C.; adding a quantity of dry methanol to said aqueous solution to bring the methanol concentration to approximately 50% by volume to effect precipitation of the alkali-metal phosphate-modified starch fraction of substantially higher viscosity in aqueous dispersion than the original material; cooling the mixture while agitating the same to a temperature of about 20° C.; separating the precipitated solids from the mixture; washing the precipitated solids at 20° C. with a 60% aqueous methanol solution; again washing the precipitated solids at 20° C. with a 75 volume percent aqueous methanol solution; and finally washing the precipitated solids with dry methanol and recovering the same.

References Cited in the file of this patent

UNITED STATES PATENTS 2,971,954  Kodras _____ Feb. 14, 1961